United States Patent
Narayana et al.

(10) Patent No.: US 10,261,937 B2
(45) Date of Patent: Apr. 16, 2019

(54) METHOD AND SYSTEM FOR COMMUNICATION OF DEVICE INFORMATION

(71) Applicants: Srilatha Narayana, Karnataka (IN); Karthik Venkatasubba, Karnataka (IN)

(72) Inventors: Srilatha Narayana, Karnataka (IN); Karthik Venkatasubba, Karnataka (IN)

(73) Assignee: Dell Products L.P., Round Rock, TX (US)

( * ) Notice: Subject to any disclaimer, the term of this patent is extended or adjusted under 35 U.S.C. 154(b) by 1095 days.

(21) Appl. No.: 14/341,550

(22) Filed: Jul. 25, 2014

(65) Prior Publication Data

US 2016/0026602 A1 Jan. 28, 2016

(51) Int. Cl.
*G06F 13/00* (2006.01)
*G06F 13/42* (2006.01)

(52) U.S. Cl.
CPC ...... *G06F 13/4286* (2013.01); *G06F 13/4221* (2013.01)

(58) Field of Classification Search
CPC ......... G06F 13/385; G06F 13/42; G06F 13/00
USPC .................. 710/106, 104–105, 305–306
See application file for complete search history.

(56) References Cited

U.S. PATENT DOCUMENTS

2005/0262269 A1* 11/2005 Pike .................... H04L 12/4633 710/1
2009/0164690 A1* 6/2009 Slaight .................. G06F 13/385 710/306

OTHER PUBLICATIONS

Moxa Inc., MiiNePort E2/E3 User's Manual, Sixth Edition, www.moxa.com/product, (c) 2013, Jul. 2013, 156 pages.

* cited by examiner

*Primary Examiner* — Tim T Vo
*Assistant Examiner* — Kim T Huynh
(74) *Attorney, Agent, or Firm* — Baker Botts L.L.P.

(57) ABSTRACT

The system comprises a device, the device comprising a physical port. The device is configured to communicate with a controller through a communication medium. The controller is situated on a circuit board. The physical port is not configured to communicate with the communication medium. The device is also configured to communicate with a processor through the circuit board, but the physical port is not configured to communicate with the processor through the circuit board. The device is additionally configured to create a first packet comprising information corresponding to first device information. The first device information is formatted in a protocol associated with the physical port. The device is further configured to transmit the first packet to the controller through the communication medium.

30 Claims, 3 Drawing Sheets

METHOD AND SYSTEM FOR COMMUNICATION OF DEVICE INFORMATION

TECHNICAL FIELD

This disclosure relates generally to information handling systems and more particularly to communication of device information.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. For example, an information handling system may be a tablet computer, a mobile device (e.g., personal digital assistant (PDA) or smart phone), or an enterprise server configured to transmit data on a wireless communications network. Information handling systems may include a variety of hardware and software components that may be configured to process, store, and communicate information and may include one or more computer systems, data storage systems, and networking systems.

Certain information handling systems comprise various types of peripheral devices. These devices may be subject to certain issues and problems may arise. Traditionally, a user addresses issues with the device by connecting a cable to the device and executing device-proprietary commands. Physically connecting a serial cable in order to address issues with the device is a time consuming and involved process.

SUMMARY

According to embodiments of the present disclosure, a system comprises a device, the device comprising a physical port. The device is configured to communicate with a controller through a communication medium. The controller is situated on a circuit board. The physical port is not configured to communicate with the communication medium. The device is also configured to communicate with a processor through the circuit board, but the physical port is not configured to communicate with the processor through the circuit board. The device is additionally configured to create a first packet comprising information corresponding to first device information. The first device information is formatted in a protocol associated with the physical port. The device is further configured to transmit the first packet to the controller through the communication medium.

In an additional embodiment of the present disclosure, a system comprises a controller and the controller is situated on a circuit board. In the system, the controller is configured to communicate with a device through a communication medium. The device is situated on a circuit board and the device comprises a physical port. The physical port is not configured to communicate with the communication medium. The controller is additionally configured to communicate with a processor through the communication medium. The processor is situated on the circuit board, but the physical port is not configured to communicate with the processor through the circuit board. The controller is also configured to create a first packet comprising information corresponding to first device information. The first device infomrnation is formatted in a protocol associated with the physical port. The controller is further configured to transmit the first packet to the device through the communication medium.

In another embodiment of the present disclosure, a method comprises creating, using a device, a first packet comprising information corresponding to first device information. The device comprises a physical port. The first device information is formatted in a protocol associated with the physical port. The method also comprises transmitting the first packet from the device to a controller through a communication medium. The controller is situated on a circuit board. The circuit board comprises a processor. In the method, the physical port is not configured to communicate with the processor through the circuit board and the physical port is not configured to communicate with the communication medium.

In yet another embodiment of the present disclosure, a method comprises creating, using a controller, a first packet comprising information corresponding to first device information. The controller is situated on a circuit board. The circuit board comprises a processor. The method further comprises transmitting the first packet to a device through the communication medium. The device comprises a physical port. The physical port is not configured to communicate with the processor through the circuit board and the physical port is not configured to communicate with the communication medium. In the method, the first device information is formatted in a protocol associated with the physical port.

Certain embodiments of the present disclosure may provide one or more technical advantages. For example, one advantage can be enabling remote troubleshooting for computing systems or subsystems (such as storage and networking subsystems). As another example, one advantage can be reducing or eliminating the need for additional hardware (such as a serial cable or an RS-232 cable) for addressing problems with a device. Another example of a technical advantage is reducing or eliminating the need for peripheral devices of a computer to fabricate certain serial pins or ports (e.g., those associated with JTAG or UART ports) on the printed circuit boards of the peripheral devices, which may reduce the cost of fabricating these devices. Another example of a technical advantage is reducing or eliminating a need for physical access to a peripheral device in order to address problems with that device; for example, this can mean reducing or eliminating the need to open a chassis housing the peripheral device and connecting a cable to the device. Another example of a technical advantage is that the system supports multiple users connecting to the port of the managed device, rather than the system supporting only a single, physical session via the physical port. Another example of a technical advantage is allowing troubleshooting of the device without depending on a certain status or state of the host operating system. Yet another example of a technical advantage is that the disclosure does not require any special software or application to be run on the host operating system.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

Reference is now made to the following description taken in conjunction with the accompanying drawings, wherein like reference numbers represent like parts.

DETAILED DESCRIPTION

Figure 1:
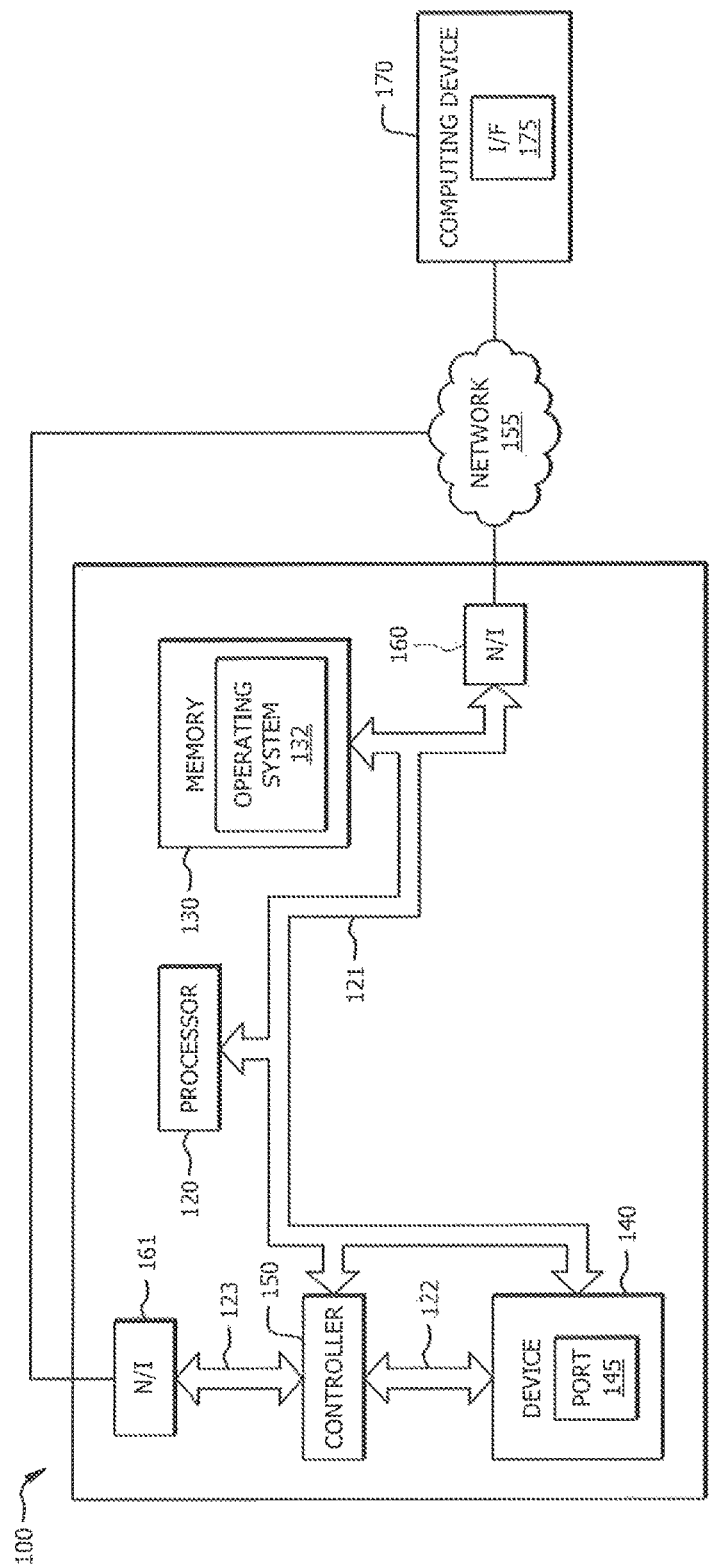
FIG. 1 illustrates a block diagram of an example of an information handling system in accordance with some embodiments of the present disclosure.

FIG. 1 illustrates a block diagram of an example of an information handling system 100 in accordance with some embodiments of the present disclosure. Components of information handling system 100 may include computing device 170, processor 120, memory 130, network interface 160 and 161, device 140, port 145, controller 150, communication medium 121, and communication medium 122. Also shown with information handling system 100 are external or remote elements, namely, network 155, and computing device 170. System 100 is configured to communicate device information formatted in accordance with a command set supported by device 140 (e.g., in the device 140 firmware protocol) from computing device 170 to controller 150 and communicate device information formatted for port 145 (e.g., in the RS-232 protocol) from controller 150 to device 140 and from device 140 to controller 150 using packets. System 100 may also be configured to cause device information received at controller 150 from device 140 to be displayed to a user through interface 175 of computing device 170 using packets.

Network 155, in some embodiments, may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 and its various components may be implemented using hardware, software, or any combination thereof. Network 155 is configured such that computing device 170 may communicate with or access information in information handling system 100, or particular components of information handling system, such as controller 150. Although FIG. 1 illustrates one network 155, it should be understood that any number of networks may be included. For example, network interface 161 may allow controller 150 to communicate through a separate network than network 155 used by network interface 160.

Computing device 170, in some embodiments, represents (and is inclusive of) a personal computer that may be used to access network 155. Alternatively, computing device 170 may be representative of a cellular telephone, an electronic notebook, a laptop, a personal digital assistant (PDA), or any other suitable device (wireless or otherwise), component, or element capable of accessing one or more elements within system 100 through network 155. Computing device 170 may be configured such that a user may manage one or more aspects of information handling system 100 remotely. Computing device 170 also may communicate with controller 150 through network 155. In certain embodiments, computing device 170 comprises interface 175. Interface 175, which may be provided in conjunction with the items listed above, may further comprise any suitable interface for a human user such as a video camera, a microphone, a keyboard, a mouse, or any other appropriate equipment according to particular configurations and arrangements. Interface 175 may be configured to present information to a user at computing device 170 via network 155. Interface 175 may provide a command line interface (CLI), a graphical user interface (GUI), or any other suitable interface configured to display information to a user. In addition, interface 175 may be a unique element designed specifically for communications involving information handling system 100. Such an element may be fabricated or produced specifically for matching applications involving a user.

Information handling system 100, in some embodiments, may comprise any instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, information handling system 100 may be a personal computer, a PDA, a consumer electronic device, a network storage device, or another suitable device and may vary in size, shape, performance, functionality, and price. In some embodiments, information handling system 100 may also comprise a server as shown in FIG. 1, for example, a DELL POWEREDGE server.

As shown in FIG. 1, components of information handling system 100 may include, but are not limited to, computing device 170, processor 120 and communication medium 121 that communicatively couples various components to processor 120 including, for example, memory 130, network interface 160, device 140, and controller 150. Additional components of information handling system 100 include communication medium 122 that communicatively couples controller 150 and device 140 in an out-of-band connection (e.g., by using a bridge or other suitable structure in processor 120 to allow messages to be passed between controller 150 and device 140 without using cycles of processor 120) and network interface 161 that is communicatively coupled to controller 150 through communication medium 123. Although FIG. 1 illustrates one of each component in information handling system 100, it should be understood that information handling system 100 may comprise one or more of each component, and may comprise only some of the components while omitting others. In addition information handling system 100 may comprise additional components not illustrated in FIG. 1. For example, information handling system 100 may include one or more storage devices, one or more communications ports for communicating with external devices as well as various input and output (I/O) devices, such as a keyboard, a mouse, and a video display. Information handling system 100 may also include firmware for controlling and/or communicating with, for example, hard drives, network circuitry, memory devices, I/O devices, and other peripheral devices.

Processor 120 may, in various embodiments, comprise any system, device, or apparatus operable to interpret and/or execute program instructions and/or process data. Processor 120 may include one or more: microprocessors, microcontrollers, digital signal processors (DSP), application specific integrated circuits (ASIC), or another component comprising digital or analog circuitry configured to interpret and/or execute program instructions and/or process data. In some embodiments, processor 120 may interpret and/or execute program instructions and/or process data stored locally (e.g., in memory 130). In the same or alternative embodiments, processor 120 may interpret and/or execute program instructions and/or process data stored remotely. In certain embodiments, processor 120 may be situated on a circuit board.

Memory 130 may, in various embodiments, comprise any system, device, or apparatus operable to retain and/or retrieve program instructions and/or data (e.g., computer-readable media). As shown in the embodiment of FIG. 1, memory 130 stores operating system 132, which may represent instructions executable by processor 120 to operate information handling system 100 after booting. Memory 130 may comprise one or more modules; such modules can include random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

In some embodiments, network interface 160 and 161 may be any suitable system, apparatus, or device operable to serve as an interface between information handling system 100 and network 155. Network interface 160 may enable information handling system 100 to communicate over network 155 using a suitable transmission protocol and/or standard, including, but not limited to, transmission protocols and/or standards enumerated above with respect to the discussion of network 155. Network interface 161 may be communicatively coupled to controller 150 by communication medium 123.

Communication medium 121, communication medium 122, and communication medium 123 may, in various embodiments, be implemented using one or more bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express (PCIe) bus, PCIe Vendor Defined Message (VDM) Hyper-Transport (HT) bus, System Management Bus (SMBus), Inter-Integrated Circuit (I2C) bus, and Video Electronics Standards Association (VESA) local bus. Communication medium 121 may further comprise a bridge within processor 120 that creates a communicative path between device 140 and controller 150 without involving the use of cycles of processor 120. In some embodiments, this can provide for an out-of-band communication path. As an example, an out-of-band connection may allow computing device 170 to communicate with device 140 regardless of the state of operating system 132 (e.g., it is not fully operational or it is malfunctioning). Communication medium 123 creates a communicative path between controller 150 and network interface 161 without involving operating system 132. This may allow computing device 170 to communicate with controller 150 through network interface 161 via network 155 regardless of the state of operating system 132 (e.g., it is not fully operational or it is malfunctioning). Suitable structures that can facilitate communication between device 140 and controller 150 other than bus structures can be used to implement communication media 121, 122, and 123 in various embodiments. In some embodiments, communication medium 122 may be omitted and controller 150 may communicate with device 140 over communication medium 121.

Device 140 may, in various embodiments, be hard drives, solid state drives (SSDs), network circuitry, network interface cards (NICs) memory devices, I/O devices, controllers (e.g., network controllers, storage controllers, graphic controllers), or any other peripheral devices that can communicate with controller 150. In some embodiments, device 140 may be situated on a circuit board along with processor 120 and controller 150. Communications may take place over one or more communication paths, such as communication mediums 121 and 122. Device 140 can include port 145, which may be a physical port (e.g., a serial port) configured to provide a manner of communicating with device 140 (e.g., communicating information related to the operation of device 140). For example, port 145 may be implemented as, or include, a Joint Test Action Ground (JTAG) port or a universal asynchronous receiver/transmitter (UART) port. In certain embodiments, a protocol (such as the RS-232 protocol) is associated with physical port 145.

In some embodiments, device information may be information formatted in a protocol associated with physical port 145 or in a format supported by the firmware of device 140. Device information may comprise a command for device 140 to perform an action. Device information may comprise a response from device 140. Examples of commands for device 140 and the description of the commands are listed in Table 1 and Table 2 below. A response from device 140 may be sent to controller 150 after device 140 performs the requested command. Examples of responses from device 140 corresponding to the commands are also listed in Table 1 below.

TABLE 1

Examples of Commands and Responses for Device 140

| Commands | Description | Response |
| --- | --- | --- |
| dump 16/b 0x2a5401aa | dump count bytes at address | 0x2a5401aa <rtraid_dupEMM+74>: 0x00 0xe1 0x83 0x63 0x08 0x73 0x83 0x6d 0x2a5401b2 <rtraid_dupEMM+82>: 0x10 0x23 0x0a 0x7d 0x10 0x2e 0x83 0x6b |

TABLE 1-continued

Examples of Commands and Responses for Device 140

| Commands | Description | Response |
|---|---|---|
| dump 16/w 0x2a5401aa | dump count words at address | 0x2a5401aa <rtraid_dupEMM+74>: 0x6383e100 0x6d837308 0x7d0a2310 0x6b832e10<br>0x2a5401ba <rtraid_dupEMM+90>: 0x7b0b2d10 0x66932b10 0x65937609 0x75086260<br>0x2a5401ca <rtraid_dupEMM+106>: 0x67936150 0x611c622c 0x770a4218 0x6170221b<br>0x2a5401da <rtraid_dupEMM+122>: 0x611ce018 0x212b4128 0x720b6293 0x440d6420 |
| stacktrace | dump stack backtrace | #0 0x29668cf4 in L_copydest0_loop ( ) from /home/kv/crashanalysis/new/lib/libc.so.6<br>#1 0x2a5401aa in rtraid_dupEMM (pSrcPD=0x100, pDestPD=0x29920d08)<br>at /usr/src/debug/rtcem-1.0+git408+55fb5084fe07d40a1870f5fb599bd9d28a05c2daf-r8.7/source/rtutils/rt_dup.c:143<br>#2 0x2a4fb3f8 in rtCmd (This=optimized out>, cmd=0x2a50f598, res=0x2a368a3c)<br>at /usr/src/debug/rtcem-1.0+git408+55fb5084fe07d40a1870f5fb599bd9d28a05c2daf-r8.7/source/rtraid/libmain.c:1750<br>#3 0x2a467c54 in getEMMs (This=This@entry=0x420110, cmd=cmd@entry=0x2a368a58, res=res@entry=0x2a368a3c)<br>at /home/jenkins/jenkins_slave_builds_prod/workspace/idrac-13g-staging-release-X-Rev/build-yocto-sh4/tmp/work/sh4-poky-linux/msc-1.0-r19.19/source/msc_raid_mgmt/offline_raid/src/common/cached.c:2464<br>#4 0x2a468c68 in cachedGetObject (This=This@entry=0x420110, cmd=cmd@entry=0x2a368a58, res=res@entry=6x2a368a3c)<br>at /home/jenkins/jenkins_slave_builds_prod/workspace/idrac-13g-staging-release-X-Rev/build-yocto-sh4/tmp/work/sh4-poky-linux/msc-1.0-r19.19/source/msc_raid_mgmt/offline_raid/src/common/cached.c:2701<br>#5 0x2a49a942 in CachedCmd (This=0x420110, cmd=0x2a368a58, res=0x2a368a3c) |
| pcidumpb 0x0000000110 | dump count bytes at PCI address | 00000001: dd 00 f0 f8 dd 00 f0 47-da 00 f0 f8 dd 00 f0 f8 |
| pciconfigdump 0 0 1 1 10 | dump count bytes at PCI Configuration address | bus=0 dev=0 fun=1 off=1 count=10<br>01: 38 38 38 38 38 38 38 38-38 38 38 38 38 38 38 38 |
| break *0x080483c4 | PPC Data breakpoint | Note: breakpoint 3 also set at pc 0x80483c4.<br>Breakpoint 4 at 0x80483c4 |

| info break | PPC | Num | Type | Disp | Enb | Address | What |
|---|---|---|---|---|---|---|---|
| | breakpoint utilities | 1 | static tracepoint | keep | y | 0x29668cf4 | <L_copydest0_loop> |
| | | 2 | breakpoint | keep | y | 0x29668cf4 | <L_copydest0_loop> |
| | | 3 | breakpoint | keep | y | 0x080483c4 | |
| | | 4 | breakpoint | keep | y | 0x080483c4 | |

TABLE 2

Examples of Commands and Command Descriptions for Device 140

| Command | Command Description |
|---|---|
| dw addr count | dump count shorts at address |
| eb addr data | enter data byte at address |
| ei addr data | enter data word at address |
| ew addr data | enter data short at address |
| mv from Addr to Addr count | copy count bytes from from starting memory Address to ending memory Addrress |
| sl addr word | search a range of 64 kilobytes at address for word |
| fill addr data count | fill count bytes of data at address |
| mem | dump memory blocks |
| dcrdi addr count | dump count words from PPC DCR space |
| dcrei addr data | enter data word into PPC DCR space |
| pdi addr count | dump count shorts at PCI address |
| pdi64 addrh addrL count | dump count 64-bit at PCI address |
| peb addr data | enter data byte at PCI address |
| pei addr data | enter data word at PCI address |
| pei64 addrH AddrL data64 | enter 64 bit data at PCI address |
| pcdb bus dev func off count | dump count shorts at PCI Configuration address |
| pceb bus ev func off count | enter data byte at PCI Configuration address |
| pcei bus dev func off data | enter data word at PCI Configuration address |
| bi bi 0|1 Addr|SYmbol | PPC Instruction breakpoint |

In certain embodiments, controller 150 may be implemented using any suitable device, system, or apparatus configured to monitor and/or manage one or more aspects of information handling system 100. For example, controller 150 may include or may be a part of a DELL REMOTE ACCESS CONTROLLER (DRAC) or an INTEGRATED DELL REMOTE ACCESS CONTROLLER (iDRAC). In certain embodiments, controller 150 may enable an administrator or other user to remotely monitor and/or remotely manage one or more aspects of information handling system 100; this can, but does not need to, occur using an out-of-band communications channel (e.g., a communication channel which does not require the use of cycles of processor 120). The ability for an administrator or user to remotely monitor and/or remotely manage system 100 allows the administrator to address one or more issues with device 140 or other components of system 100 without being physically present at the location of system 100 or one of its components. In certain embodiments, controller 150 may comprise a module to enable field service debugging by a user of controller 150. For example, when field service debugging is enabled a user of controller 150 may receive broader permissions to access controller 150 or perform debugging of controller 150 itself, rather than the manufacturer of controller 150 being required to perform these actions. In certain embodiments, controller 150 may be situated on a circuit board along with device 140 and processor 120. Controller 150 may be configured to communicate with device 140 via communication medium 121 or communication medium 122. In some embodiments, it is advantageous to communicate with device 140 via controller 150 to troubleshoot problems with device 140, rather than physically connecting to device 140 because it can reduce or eliminate the need (1) for additional hardware (e.g., a serial cable), (2) for peripheral devices of a computer (e.g., device 140) to include certain serial pins or ports (e.g., those associated with JTAG or UART ports) for addressing problems with a device and thereby reducing the cost of fabricating these devices, and (3) for physical access to a peripheral device (e.g., device 140) such as the need to open a chassis housing the peripheral device and connect a cable to the device.

In some embodiments, controller 150 is configured to: communicate with processor 120 through communications medium 121, communicate with device 140 through communication medium 121 or communication medium 122, create a first packet comprising information corresponding to first device information that is formatted in a protocol associated with port 145, and transmit the first packet to device 140 through communication medium 121 or 122. Controller 150 may be further configured to: receive a second packet from device 140 through communication medium 121 or 122, extract the second device information from the second packet, the second device information formatted in a protocol associated with physical port 145, and process the second device information. Controller 150 may be configured to cause the device information to be displayed through interface 175 (which may display the information to a user at computing device 170).

In some embodiments, device 140 is configured to communicate with controller 150 through communication medium 121 or 122. Controller 150 is situated on a circuit board. Port 145 of device 140 is not configured to communicate with communication medium 121 or 122 and port 145 is not configured to communicate with processor 120 through the circuit board in various embodiments. Device 140 is additionally configured to create a first packet comprising information corresponding to first device information. The first device information is formatted in a protocol associated with port 145. Device 140 is further configured to transmit the first packet to controller 150 through communication medium 121 or 122. In certain embodiments, device 140 may be further configured to: receive a second packet comprising information corresponding to device information from controller 150, extract the second device information from the second packet (the second device information formatted in a protocol associated with port 145), and process the second device information.

In one example of the operation of information handling system 100, a user may input device information, such as a command to retrieve log files from device 140, to interface. Controller 150 may receive the device information from computing device 170 formatted in accordance with a command set supported by device 140. Controller 150 may create one or more packets, for example Management Component Transport Protocol (MCTP) packets, comprising information corresponding to device information. In some embodiments, the device information in the packet(s) comprises information formatted in a protocol associated with physical port 145, for example a message or command in the RS-232 protocol may be in the packet(s). In some embodiments, the device information in the packet(s) comprises information related to the information formatted in a protocol associated with physical port 145, rather than the information formatted in the protocol associated with physical port 145 itself. For example, the packet(s) may comprise information related to an RS-232 message, such as a command to retrieve log files. After creating the packet(s), controller 150 transmits the packet(s) to device 140.

When device 140 receives the MCTP packet(s) from controller 150 (which can be through a connection using communication medium 122 or 121), in some embodiments, it extracts the information formatted in a protocol associated with physical port 145. For example, device 140 may extract the command in the RS-232 protocol to retrieve log files from device 140. In some embodiments, device 140 may extract information related to information formatted in a protocol associated with physical port 145. In this embodiment, device 140 also generates the information formatted in a protocol associated with physical port 145 from the information in the packet(s). For example, device 140 may extract information related to a command to retrieve log files and generate the command in the RS-232 protocol from the information related to the command extracted from the packet.

Continuing with the example, after extracting device information from the packet(s), device 140 then processes the command to retrieve log files. Device 140 may create one or more MCTP packet(s) comprising device information corresponding to the log files. In some embodiments, the device information in the packet(s) comprises information formatted in a protocol associated with physical port 145, for example the packet(s) may contain the log files in the RS-232 protocol. In some embodiments, the device information in the packet(s) comprises information related to the information formatted in a protocol associated with physical port 145, rather than the information formatted in the protocol associated with physical port 145 itself. For example, the packet(s) may comprise information related to the log files. After creating the packet(s), device 140 transmits the packet(s) to controller 150.

When controller 150 receives the packet(s) from device 140 (e.g., through a communication medium 121 or 122), controller 150 extracts the log files. In some embodiments controller 150 extracts the information formatted in a protocol associated with physical port 145. For example, controller 150 may extract the log files formatted in the RS-232 protocol from the packet(s). In certain embodiments, controller 150 may extract information related to information formatted in a protocol associated with physical port 145. In this embodiment, controller 150 also generates the information formatted in a protocol associated with physical port 145 from the information in the packet(s). For example, controller 150 may extract information related to the log files formatted in the RS-232 protocol, rather than extracting the log files themselves, and then generate the log files from the extracted information. Controller 150 may further display the device information on computing device 170 using interface 175. For example, once controller 150 determines the log file from packet(s) sent by device 140, controller 150 may cause the log file to be displayed through interface 175.

Modifications, additions, or omissions may be made to the systems described herein without departing from the scope of the disclosure. For example, information handling system 100 may include any number of devices 140, controllers 150, processors 120, memories 130, or communication media 121 and 122. As another example, although FIG. 1 illustrates communication medium 122 as an out-of-band connection between controller 150 and device 140, communication medium 121 may also be used for an out-of-band connection between controller 150 and device 140 (e.g., by using a bridge or other suitable structure in processor 120 to allow messages to be passed between controller 150 and device 140 without using cycles of processor 120). The components may be integrated or separated. Moreover, the operations may be performed by more, fewer, or other components. Additionally, the operations may be performed using any suitable combination of hardware, software, firmware, or logic embodied in a computer-readable medium or in computing hardware.

Figure 2:
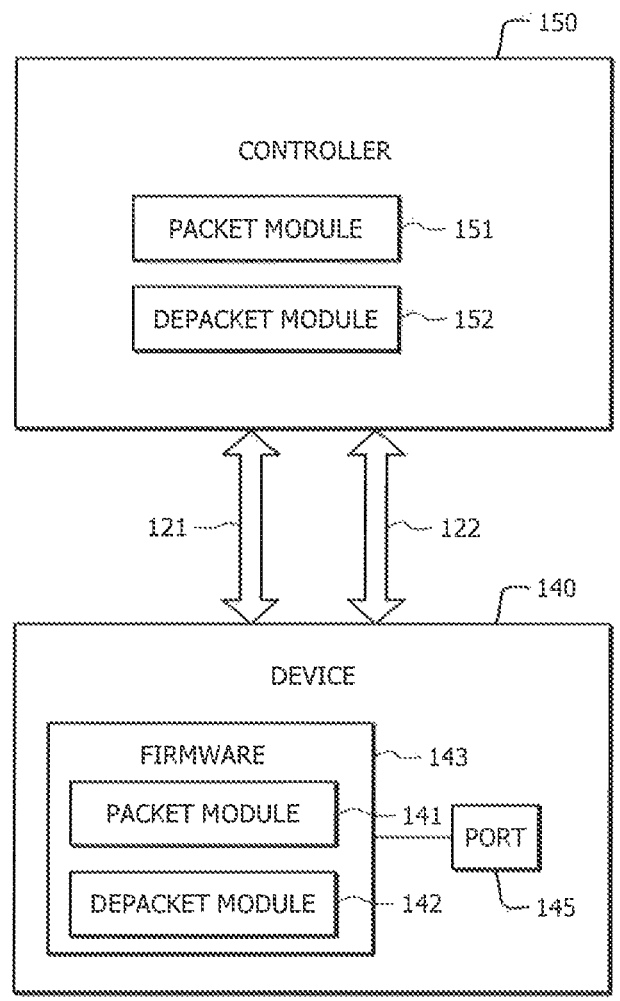
FIG. 2 illustrates a block diagram of an example of a device and a controller both configured to send and receive packets.

FIG. 2 illustrates a block diagram of an example of system 100 wherein device 140 and controller 150 are configured to send and receive packets via communication medium 121 or 122. In some embodiments, communication medium 122 may be omitted and controller 150 may send and receive packets via communicate medium 121. For example, if controller 150 sends a packet to device 140 via communication medium 121, it does not also send the packet via communication medium 122. In some embodiments, controller 150 comprises packet module 151 and de-packet module 152. Controller 150 may comprise other components, including hardware components, modules, or processors. In some embodiments, packet module 151 may create a packet comprising information corresponding to device information. The packet can be configured to be sent to device 140 via communication medium 121 or 122. For example, controller 150 may send a command to device 140 to retrieve device information from device 140. In this example, packet module 151 may create a packet, such as an MCTP packet, comprising information corresponding to a RS-232 command. In some embodiments, the command in the packet(s) is formatted in a protocol associated with physical port 145. For example, port 145 may comprise a JTAG port or a UART port and the command may be formatted in the RS-232 protocol. In certain embodiments, the command in the packet(s) comprises information related to the command, rather than the command itself. For example, the packet(s) may comprise information related to the command to retrieve log files formatted in the RS-232 protocol. In certain embodiments, packet module 141 also transmits the packet to device 140 via communication medium 121 or 122.

In some embodiments, de-packet module 152 may extract information corresponding to device information from a packet (the packet being sent to controller 150 from device 140 via communication medium 121 or 122). For example, once device 140 sends information in a packet to controller 150, de-packet module 152 may extract the information corresponding to the response from device 140. De-packet module 152 extracts the response (e.g., log files that are formatted in the RS-232 protocol). In some embodiments, de-packet module 152 may extract information related to the device information. For example, de-packet module 152 can generate the log files in the RS-232 protocol from the device information in the packet(s).

In some embodiments, device 140 comprises firmware 143 and physical port 145. Device firmware 143 may be any suitable system, apparatus, device, code, or logic operable to control and/or monitor device 140. Firmware 143 can include software embedded in device 140 used to perform predefined tasks. Firmware 143 can be stored in non-volatile memory or other memory that does not lose stored data upon the loss of power. In certain embodiments, firmware 143 is configured to communicate with physical port 145 of device 140. Firmware 143 may be able to process device information received either through port 145 or from controller 150. For example, firmware 143 may execute commands sent by controller 150 (e.g., for troubleshooting issues related to device 140) and may access information associated with device 140 (e.g., such as log files or other information that can be used to monitor or address issues with device 140).

In certain embodiments, firmware 143 may comprise packet module 141 and de-packet module 142 of device 140. In general, de-packet module 142 may extract information corresponding to device information from a packet, the packet being sent to device 140 from controller 150 via communication medium 121 or 122. For example, once controller 150 sends information related to a serial command (e.g., a command in the RS-232 protocol) in a packet to device 140, de-packet module 142 may extract the information such that it may determine the serial command from controller 150. For example, de-packet module 142 may extract from the received MCTP packet a command, such as a command to retrieve the log files of device 140.

In some embodiments, packet module 141 may create a packet comprising information corresponding to device information and the packet may be configured to be sent to controller 150 via communication medium 121 or 122. For example, firmware 143 may determine information used to address issues with device 140 (such as a log file) that needs to be sent to controller 150. In this example, packet module 141 may create a packet, such as an MCTP packet, comprising information related to the log file using the RS-232 protocol. Packet module 141 transmits the packet to controller 150 via communication medium 121 or 122.

Modifications, additions, or omissions may be made to the systems described herein without departing from the scope of the disclosure. For example, although FIG. 2 illustrates packet module 141 and de-packet module 142 as two separate modules, it should be understood that their functions may be combined into one module, split up into several modules, or performed by other aspects of firmware 143, depending on particular implementations. As another example, although packet module 151 and de-packet module 152 are illustrated as two separate modules, their functions may be combined into one module, split up into several modules, or performed by controller 150 itself. The components may be integrated or separated. Moreover, the operations may be performed by more, fewer, or other components. Additionally, the operations may be performed using any suitable logic comprising software, hardware, and/or other logic.

Figure 3:
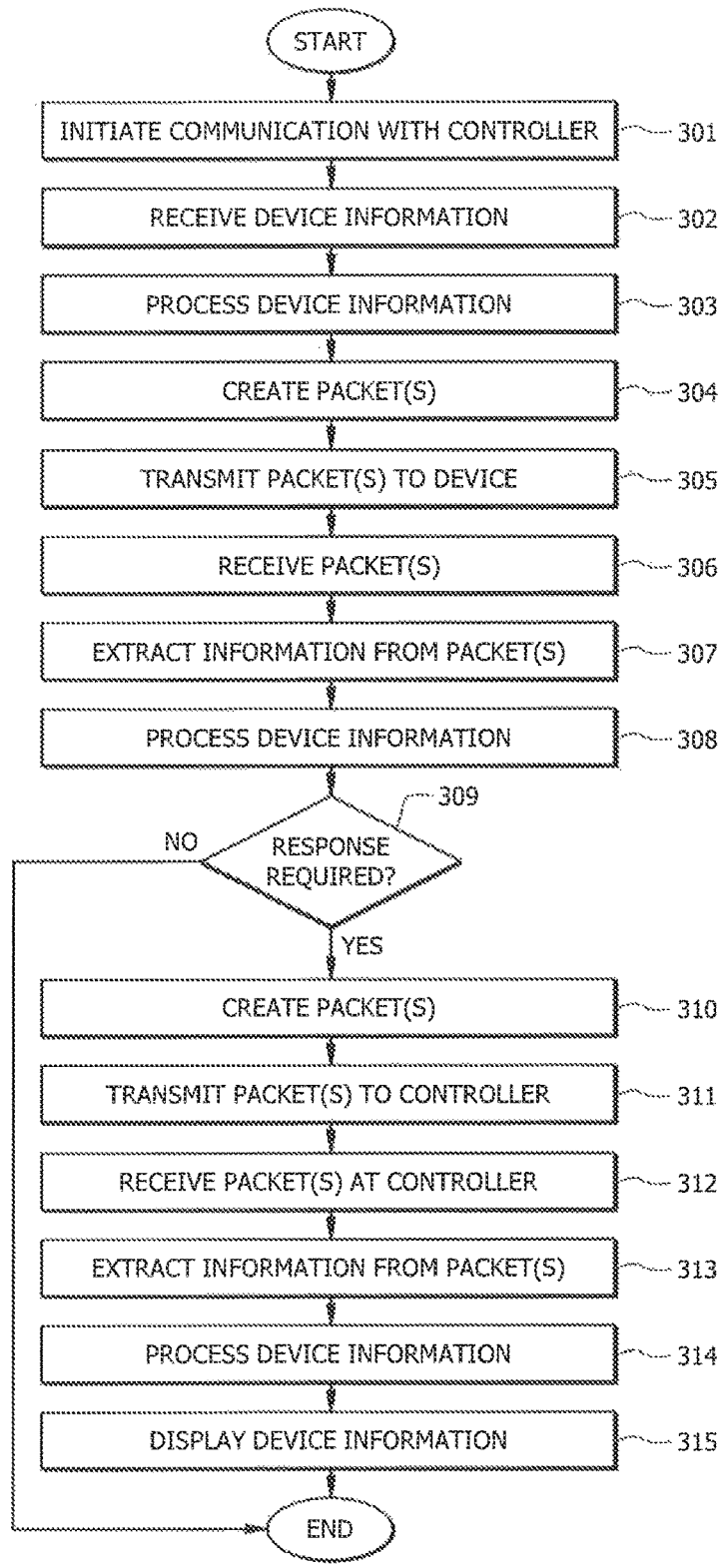
FIG. 3 illustrates a flowchart describing an example of communicating device information from a device to a controller and communicating device information from a controller to a device.

FIG. 3 illustrates a flowchart describing an example of communicating device information from device 140 to controller 150 and communicating device information from controller 150 to device 140. The method begins at step 301 when, in some embodiments, computing device 170 initiates communication with controller 150. For example, this may allow computing device 170 to communicate with controller 150 (e.g., using a command line interface and/or a graphical interface). As another example, computing device 170 may also initiate communication with controller 150 using a Web browser over a network (e.g., the Internet or a local area network). In certain embodiments, controller 150 may receive information from computing device 170 through interface 175 to initiate communication. For example, a user may type a specific command, such as "RACAdm" as used in DELL REMOTE ACCESS CONTROLLER products, which causes information handling system 100 to provide an interface for the user to communicate with controller 150. In some embodiments, system 100 supports multiple users at multiple computing devices, for example computing device 170, connecting to controller 150 at the same time. As an example, this can be advantageous over a system that supports only a single, physical session via a physical port. As another example of an advantage, this may allow collaboration among multiple users when addressing issues related to device 140.

At step 301, in some embodiments, controller 150 may be configured to emulate the Serial interface or UART interface for a DELL POWEREDGE RAID CONTROLLER (PERC) device on interface 175. For example, interface 175 on computing device may appear similar to the command line interface that would be displayed if computing device 170 was connected to a physical port such that it would be in communication with device 140. In some embodiments, device 140 may be in its initialization phase when controller 150 attempts to establish a connection to device 140. For example, during its initialization phase, device 140 may be in the process of booting up or establishing its side-band interface (e.g., the interface that enables communication with controller 150 through an out-of-band connection). Controller 150 may not establish communication with device 140 while device 140 is in its initialization phase (e.g., device 140 is booting up and its side-band interface is coming up). If this occurs, computing device 170 may receive an error (e.g., that device 140 may not communicate while completing its initialization phase) or a wait message (e.g., wait for a period of time and attempt to establish a connection with device 140). In some embodiments, computing device 170 may send a command to controller 150 so that controller 150 will inform computing device 170 whether device 140 is able to receive communications from controller 150.

Once communication between computing device 170 and controller 150 has been initiated, controller 150 may receive a command from computing device 170 regarding device information in step 302. For example, controller 150 may receive a command from computing device 170 to retrieve the log files of device 140 in a format supported by the firmware of device 140. Controller 150 then processes the command in step 303. For example, controller 150 may generate a corresponding command formatted in the protocol used by port 145 (e.g., the RS-232 protocol).

At step 304, in some embodiments, packet module 151 creates one or more packets, for example MCTP packets, comprising information corresponding to the command. In some embodiments, the command itself is placed in the packet(s) in a protocol associated with physical port 145. For example, port 145 may comprise a Joint Test Action Ground (JTAG) port and the command may be formatted in the RS-232 protocol. As another example, port 145 may comprise a universal asynchronous receiver/transmitter (UART) port and the command may be formatted in the RS-232 protocol. In some embodiments, the information corresponding to the command in the packet(s) is information related to, or representative of, the command, rather than the command itself. For example, the packet(s) may comprise information related to the command to retrieve log files formatted in the RS-232 protocol.

In step 305, controller 150 transmits the packet(s) to device 140 via communication medium 121 or 122. For example, communication medium 122 may comprise a SMBus or an I2C bus, which support communicating information formatted in an MCTP protocol. As another example, controller 150 may transmit the packet(s) to device 140 via communication medium 121, which may comprise a PCIe out-of-band bus. Using an out-of-band PCIe bus may, in some embodiments, allow the MCTP packet(s) to be sent from controller 150 to device 140 without using cycles of processor 120. As another example, using an out-of-band bus may allow for communication between controller 150 and device 140 without involvement of operating system 132 and may reduce or prevent the need for software (e.g., applications, drivers, or firmware) to be run on operating system 132 to enable the communication. As another example, using an out-of-band communication can allow computing device 170 to collect information from device 140 regardless of the state of operating system 132 (e.g., even if it is malfunctioning or if it has not been booted up). In some embodiments, a module within controller 150 may transmit the packet(s). For example, packet module 151 may transmit the packet(s) to device 140 via an SMBus, an I2C bus, or a PCIe bus.

In step 306, in some embodiments, device 140 receives the packet(s) from controller 150 through communication medium 121 or 122. For example, components or modules of device 140 may receive the packet(s), but not port 145. In step 307, de-packet module 142 extracts information corresponding to the command from the packet(s). In some embodiments, de-packet module 142 extracts the command formatted in a protocol associated with physical port 145. For example, de-packet module 142 may extract the RS-232 command configured to retrieve log files from device 140. In some embodiments, the information corresponding to the command in the packet(s) is information related to, or representative of, the command, rather than the command itself. For example, de-packet module 142 may extract information from the packet(s) related to an RS-232 command configured to retrieve log files and generate the RS-232 command from the information related to it.

In step 308, in some embodiments, device 140 processes the command determined at step 307. For example, if the command is to retrieve log files of device 140 and if device 140 is a PERC device, then device 140 would retrieve its TTY log, or controller log. In some embodiments, controller 150 may require a response from device 140 based on the command or other device information that controller 150 sent to device 140. In step 309, device 140 determines whether a response is required. If a response is not required, then the method ends. If a response is required, the method continues in step 310. For example, if controller 150 requests that device 140 send the log files to controller 150, then device 140 would determine a response is required.

In step 310, in some embodiments, packet module 141 may create one or more MCTP packets comprising device information. In some embodiments, the device information in the packet(s) comprises information formatted in a protocol associated with physical port 145, for example the packet(s) may contain the log files themselves in the RS-232 protocol. In some embodiments, the device information in the packet(s) comprises information related to, or representative of, the log files formatted in a protocol associated with physical port 145. For example, the packet(s) may comprise information related to, or representative of, the log files, rather than the log files formatted in the RS-232 protocol themselves.

After creating the packet(s), in some embodiments, device 140 transmits the packet(s) to controller 150 in step 311 via communication medium 122 or 121. For example, communication medium 122 may comprise an SMBus or an I2C bus, which support communicating information formatted in an MCTP protocol. As another example, device 140 may transmit the packet(s) to controller 150 via communication medium 121, which may comprise a PCIe out-of-band bus. Using an out-of-band PCIe bus can allow for the MCTP packet(s) to be sent from device 140 to controller 150 without using cycles of processor 120.

In step 312, in some embodiments, controller 150 receives the packet(s) from device 140, and in step 313, de-packet module 152 may extract information corresponding to the device information from the packet(s). For example, the information corresponding to the device information extracted at this step may be the device information itself (e.g., log files or other information that is formatted in the RS-232 protocol). As another example, the information corresponding to the device information can be information related to, or representative of, the device information, rather than the device information itself; the packet(s) may comprise information related to the log files of device 140 and de-packet module 152 can use this information to generate the log files in a protocol associated with port 145 (e.g., the RS-232 protocol).

In step 314, in some embodiments, controller 150 processes the response from device 140, such as the log files in the RS-232 protocol. For example, after extracting the information and determining it to be the log files of device 140, controller 150 may analyze the log file to determine any issues with device 140. Finally, in step 315, controller 150 may present information based on the response from device 140 to interface 175. For example, if computing device 170 uses a web browser to communicate with controller 150, then controller 150 may present the log files using a web GUI via network 155 such that the user at computing device 170 may view the log files. As another example, controller 150 may present information related to commands and responses using a CLI similar to the CLI that would be displayed if computing device 170 was directly connected to port 145 (e.g. an iDRAC CLI or a CLI for a PERC device).

Although described in reference to retrieving a log file, the steps of FIG. 3 may be performed by system 100 to execute any type of command to device 140 and access any type of device information related to device 140. Examples of the various types of commands and related information the commands request may be found above in Table 1. In addition, some steps from FIG. 3 may not be performed, in various embodiments; for example, device 140 may send information to controller 150 without first being sent a command to do so, such as monitoring information As another example, device 140 may send controller 150 an alert to inform it of a problem or issue with device 140.

Modifications, additions, or omissions may be made to the methods described herein without departing from the scope of the disclosure. For example, the steps may be combined, modified, or deleted where appropriate, and additional steps may be added. Additionally, the steps may be performed in any suitable order without departing from the scope of the present disclosure. While discussed as controller 150 performing the steps, any suitable component of information handling system 100 may perform one or more steps of the method.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system, comprising:
a device comprising a physical port, the device configured to:
create a first packet comprising first information associated with the device, the first information being formatted in a protocol associated with the physical port; and
transmit the first packet to a controller through a communication medium, the communication medium being an out-of-band connection;
wherein the controller analyzes the first information to identify an issue with the device.

2. The system of claim 1, wherein the device is further configured to:
receive, from the controller through the communication medium, a second packet comprising second information corresponding to a command associated with the device, the second information being formatted in a protocol associated with the physical port;
extract, from the second packet, the second information corresponding to the command; and
process the second information.

3. The system of claim 1, wherein the communication medium is selected from the group consisting of a peripheral component interconnect (PCI) bus and a system management bus (SMBus).

4. The system of claim 1, wherein the physical port is selected from the group consisting of a Joint Test Action Ground (JTAG) port and a universal asynchronous receiver/transmitter (UART) port.

5. The system of claim 1, wherein the first packet is a management component transport protocol (MCTP) packet.

6. The system of claim 1, wherein the protocol associated with the physical port comprises RS-232.

7. A system, comprising:
a controller configured to:
receive, from a computing device over a network, a command associated with a first device, the first device comprising a physical port;
create a first packet comprising first information corresponding to the command, wherein the first information is formatted in a protocol associated with the physical port; and
transmit the first packet to the device through a communication medium, the communication medium being an out-of-band connection.

8. The system of claim 7, wherein the controller is further configured to:
receive a second packet from the device through the communication medium, the second packet comprising second information associated with the device, the second information being formatted in a protocol associated with the device;
extract, from the second packet, the second information; and
analyze the second information to determine an issue with the device.

9. The system of claim 7, wherein the communication medium is selected from the group consisting of a peripheral component interconnect (PCI) bus and a system management bus (SMBus).

10. The system of claim 7, wherein the physical port is selected from the group consisting of a Joint Test Action Ground (JTAG) port and a universal asynchronous receiver/transmitter (UART) port.

11. The system of claim 7, wherein the first packet is a management component transport protocol (MCTP) packet.

12. The system of claim 7, wherein the protocol associated with the physical port comprises RS-232.

13. The system of claim 7, wherein the controller is further configured to present information based on the second information.

14. A method, comprising:
creating, using a device, a first packet comprising first information associated with the device, the first information being formatted in a protocol associated with a physical port of the device;
transmitting the first packet from the device to a controller through a communication medium, the communication medium being an out-of-band connection; and
wherein the controller analyzes the first information to identify an issue with the device.

15. The method of claim 14, further comprising:
receiving, at the device, a second packet from the controller through the communication medium, wherein:
the second packet comprises second information corresponding to a command associated with the device;
the second information being formatted in a protocol associated with the physical port;
extracting from the second packet, the second information corresponding to the command; and
processing the second information.

16. The method of claim 14, wherein the communication medium is selected from the group consisting of a peripheral component interconnect (PCI) bus and a system management bus (SMBus).

17. The method of claim 14, wherein the physical port is selected from the group consisting of a Joint Test Action Ground (JTAG) port and a universal asynchronous receiver/transmitter (UART) port.

18. The method of claim 14, wherein the first packet is a management component transport protocol (MCTP) packet.

19. The method of claim 14, wherein the protocol associated with the physical port comprises RS-232.

20. A method, comprising:
receiving, from a computing device over a network, a command associated with a first device, the first device comprising a physical port;
creating, using a controller, a first packet comprising first information corresponding to the command, wherein the first information corresponds to the command and is formatted in a protocol associated with the physical port; and
transmitting the first packet to the device through a communication medium, the communication medium being an out-of-band connection.

21. The method of claim 20, further comprising:
receiving, at the controller, a second packet from the device through the communication medium, the second packet comprising second information associated with the device, the second information being formatted in a protocol associated with the device;
extracting, using the controller, the second information; and
analyzing the second information to determine an issue with the device.

22. The method of claim 20, wherein the communication medium is selected from the group consisting of a peripheral component interconnect (PCI) bus and a system management bus (SMBus).

23. The method of claim 20, wherein the physical port is selected from the group consisting of a Joint Test Action Ground (JTAG) port and a universal asynchronous receiver/transmitter (UART) port.

24. The method of claim 20, wherein the first packet is a management component transport protocol (MCTP) packet.

25. The method of claim 20, wherein the protocol associated with the physical port comprises RS-232.

26. The method of claim 20, further comprising presenting information based on the second information.

27. The system of claim 1, wherein the first information associated with the device comprises information about one or more log files of the device.

28. The system of claim 7, wherein the command comprises an instruction to retrieve one or more log files of the device.

29. The method of claim 14, wherein the first information associated with the device comprises information about one or more log files of the device.

30. The method of claim 20, wherein the command comprises an instruction to retrieve one or more log files of the device.

* * * * *